United States Patent
Chan

(10) Patent No.: US 12,355,345 B2
(45) Date of Patent: Jul. 8, 2025

(54) POWER SUPPLY CAPABLE OF STABILIZING AND COMPENSATING RESONANT VOLTAGES

(71) Applicant: ACER INCORPORATED, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 297 days.

(21) Appl. No.: 18/111,881

(22) Filed: Feb. 20, 2023

(65) Prior Publication Data

US 2024/0079961 A1    Mar. 7, 2024

(30) Foreign Application Priority Data

Sep. 2, 2022   (TW) .................................. 111133281

(51) Int. Cl.
H02M 1/42    (2007.01)
H02M 1/00    (2007.01)
H02M 3/00    (2006.01)

(52) U.S. Cl.
CPC ....... *H02M 1/4241* (2013.01); *H02M 1/0058* (2021.05); *H02M 1/007* (2021.05); *H02M 1/0025* (2021.05); *H02M 3/01* (2021.05)

(58) Field of Classification Search
CPC ...... H02M 1/007; H02M 3/01; H02M 1/0058; H02M 1/083; H02M 1/0025; H02M 1/344
See application file for complete search history.

(56) References Cited

U.S. PATENT DOCUMENTS

| | | | |
|---|---|---|---|
| 9,143,045 B2* | 9/2015 | Buchmann | H02P 7/28 |
| 9,473,036 B2* | 10/2016 | Lai | H02M 3/3376 |
| 9,997,996 B1* | 6/2018 | Halberstadt | H02M 3/33546 |
| 10,651,754 B1* | 5/2020 | Murugesan | H02M 3/33523 |
| 11,336,173 B1* | 5/2022 | Peng | H02M 3/01 |
| 2008/0239760 A1* | 10/2008 | Telefus | H02M 3/33523 363/21.01 |
| 2011/0037448 A1* | 2/2011 | Liu | H02M 3/158 323/284 |
| 2011/0292688 A1* | 12/2011 | Zhang | H02M 1/32 363/21.02 |
| 2016/0141951 A1* | 5/2016 | Mao | H02M 1/36 363/21.02 |

(Continued)

*Primary Examiner* — Gustavo A Rosario-Benitez
(74) *Attorney, Agent, or Firm* — Winston Hsu

(57) ABSTRACT

A power supply includes a transformer, a power switch, a resonant circuit, a voltage stabilization and feedback compensation circuit, and two control circuits. The power switch operates according to a first control signal so that the transformer can convert an input voltage into an output voltage. The voltage stabilization and feedback compensation circuit provides a feedback voltage associated with the input voltage and lower the feedback voltage when receiving a fourth signal having an enable level. The first control circuit adjusts the duty cycle of the first control signal and provides the fourth signal having the enable level when receiving a detecting voltage having a specific level. The second control circuit provides second and third signals for driving the resonant circuit, detects the resonant voltages of the resonant circuit, and provides the detecting voltage having the specific level when determining that the resonant circuit fails to provide zero-voltage switching.

17 Claims, 5 Drawing Sheets

(56) References Cited

U.S. PATENT DOCUMENTS

| | | | |
|---|---|---|---|
| 2020/0169160 A1* | 5/2020 | Kikuchi | H02M 3/33571 |
| 2023/0143191 A1* | 5/2023 | Endo | H02M 1/007 363/21.12 |
| 2023/0253885 A1* | 8/2023 | Nymand | H02M 1/0048 363/47 |
| 2024/0380302 A1* | 11/2024 | Mishima | H02M 1/4208 |

* cited by examiner

POWER SUPPLY CAPABLE OF STABILIZING AND COMPENSATING RESONANT VOLTAGES

BACKGROUND OF THE INVENTION

1. Field of the Invention

The present invention is related to a power supply capable of stabilizing and compensating resonant voltages, and more particularly, to a power supply circuit capable of stabilizing and compensating resonant voltages for providing zero-voltage switching.

2. Description of the Prior Art

Power supply circuits are commonly used to convert alternative-current (AC) power into direct-current (DC) voltages for driving various components in a computer system which may have different operating voltages. In a prior art fly-back power supply, a power switch is normally adopted for controlling the signal path on the primary side of a transformer, and a regulating switch is normally adopted for controlling the signal path on the secondary side of the transformer. When the power switch is turned on, the input electrical energy is converted into magnetic energy and stored in the transformer, and the regulating switch is turned off for isolating the output path. When the power switch is turned off, the energy stored in the transformer may be released to the output end via the turned-on regulating switch, wherein an output capacitor may be adopted for stabilizing the output voltage.

In the prior art fly-back power supply, the above-mentioned hard-switching of the power switch results in large switching loss, which thus lowers the overall efficiency of the power supply. A resonant converter is a switched-mode power supply containing a network of inductors and capacitors and tuned to resonate at a specific frequency for energy conversion. When the power switch switches between the turned-on and turn-off states, the inductors and capacitors in the resonant converter generate LLC resonance which converts the voltage established across the power switch into sinusoid voltage or current, thereby achieving soft-switching (i.e., zero-voltage switching) during high-frequency application.

However, the value of the input voltage on the primary side of the transformer may be excessively large due to the stray capacitance, stray inductance or parasite devices present in the circuit loop, which in turn results in excessively large resonant voltages of the resonant switches in the resonant converter. Under such circumstance, the resonant converter may fail to provide zero-voltage switching since the excessively large resonant voltages may not be resonated to the zero voltage in time. The above-mention abnormal resonant state may increase the switching loss and reduce the conversion efficiency of the power supply. Therefore, there is a need for a power supply capable of stabilizing and compensating resonant voltages.

SUMMARY OF THE INVENTION

The present invention provides a power supply which stabilizes and compensates resonant voltages. The power supply includes an input end coupled to an input voltage, an output end for outputting an output voltage, a transformer, a storage capacitor, a switch, a resonant circuit, a voltage stabilization and feedback compensation circuit, a first control circuit and a second control circuit. The transformer is configured to transfer energy of the input voltage from a primary side to a secondary side for supplying the output voltage. The transformer includes a first secondary winding disposed on the secondary side and including a first dotted terminal and a first undotted terminal, a second secondary winding disposed on the secondary side and including a second dotted terminal and a second undotted terminal, and a primary winding disposed on the primary side and including a third dotted terminal and a third undotted terminal. The storage capacitor stores the energy of the input voltage, and includes a first end coupled to the input voltage and a second end coupled to a ground level. The switch includes a first end coupled to the input voltage, a second end coupled to the second end of the storage capacitor, and a control end for receiving a first control signal which switches between a first enable level and a first disable level. The resonant circuit is coupled to the primary winding in the transformer and configured to provide a soft-switching based on a second control signal and a third control signal, wherein the second control signal switches between a second enable level and a second disable level, and the third control signal switches between a third enable level and a third disable level. The voltage stabilization and feedback compensation circuit is configured to provide a reference voltage associated with the input voltage, provide a feedback voltage associated with the reference voltage, receive a fourth control signal and lower the feedback voltage when the fourth signal is at a fourth enable level. The first control circuit is disposed on the primary side and configured to provide the first control signal and adjust a duty cycle of the first control signal according to the feedback voltage, receive a detecting voltage and provide the fourth control signal having the fourth enable level when the detecting voltage is at a first level. The second control circuit is disposed on the secondary side and configured to provide the second control signal and the third control signal, detect at least one resonant voltage of the resonant circuit, adjust a duty cycle of the first control signal according to the feedback voltage, provide the detecting voltage having the first level when it is determined based on the second control signal, the third control signal and the at least one resonant voltage that the resonant circuit is unable to provide the soft-switching, and provide the detecting voltage having a second level when it is determined based on the second control signal, the third control signal and the at least one resonant voltage that the resonant circuit is able to provide the soft-switching.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
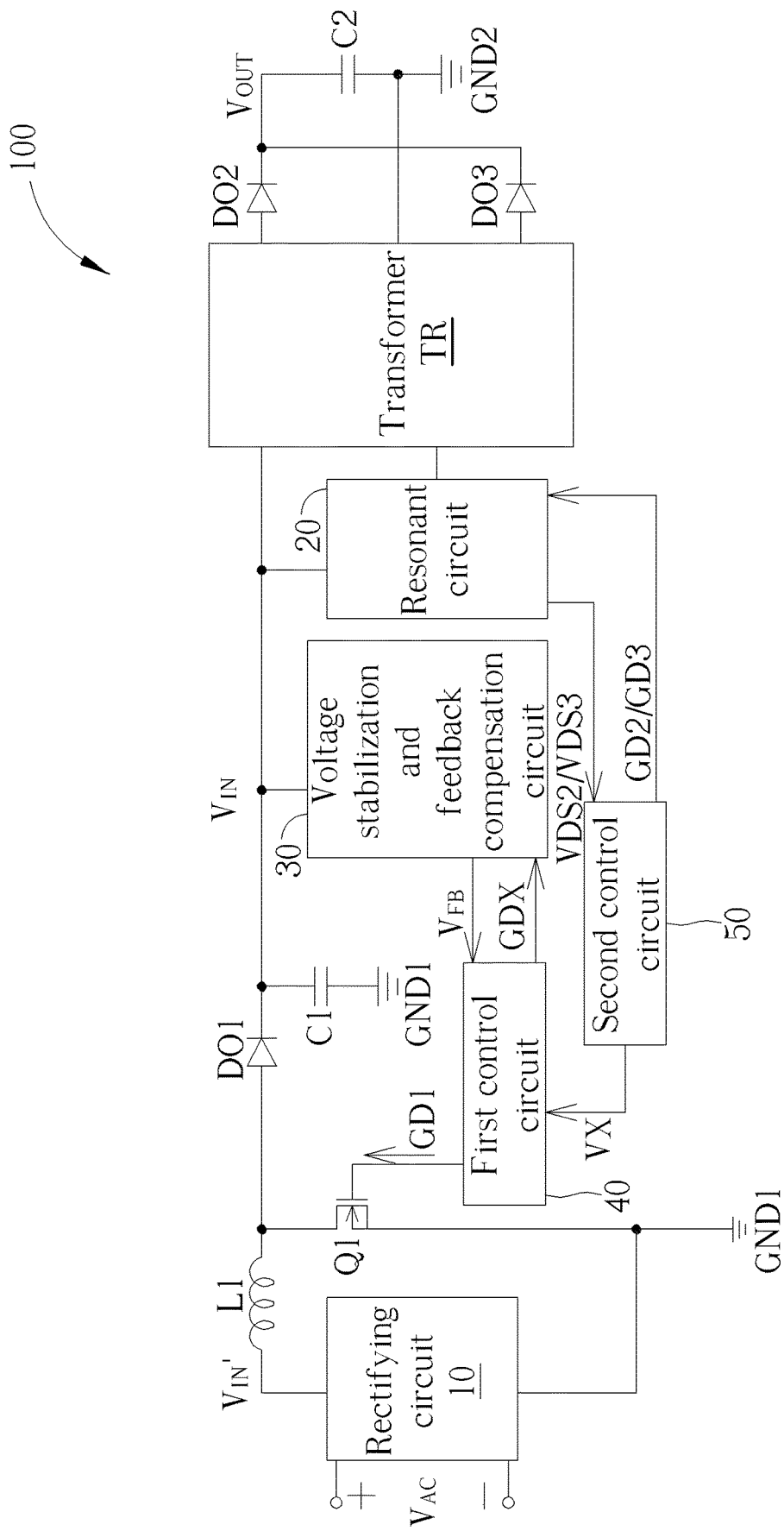
FIG. 1 is a functional diagram illustrating a power supply capable of stabilizing and compensating resonant voltages according to an embodiment of the present invention.
Figure 2:
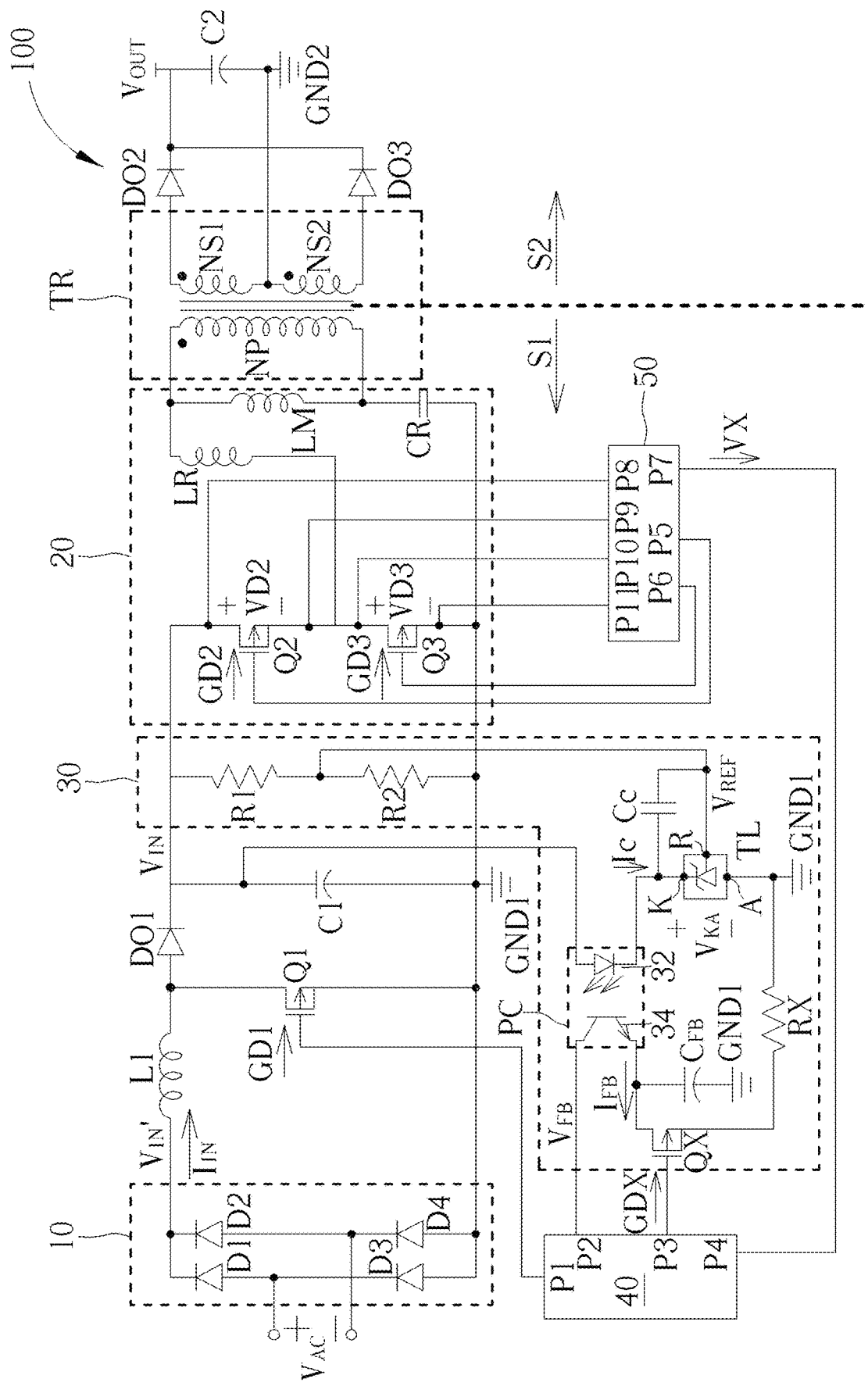
FIG. 2 is a diagram illustrating an implementation of a power supply according to an embodiment of the present invention.

FIG. 1 is a functional diagram illustrating a power supply 100 capable of stabilizing and compensating resonant voltages according to an embodiment of the present invention. The power supply 100 includes a power switch Q1, storage capacitors C1 and C2, diodes DO1-DO3, a boost inductor L1, a transformer TR, a rectifying circuit 10, a resonant circuit 20, a voltage stabilization and feedback compensation circuit 30, a first control circuit 40 and a second control circuit 50. The power switch Q1, the storage capacitor C1, the diode DO1, the boost inductor L1, the rectifying circuit 10, the resonant circuit 20, the voltage stabilization and feedback compensation circuit 30, the first control circuit 40 and the second control circuit 50 are disposed on the primary side S1 of the transformer TR. The storage capacitor C2, the diode DO2 and the diode DO3 are disposed on the secondary side S2 of the transformer TR. The power supply 100 is configured to convert an AC voltage $V_{AC}$ provided by AC mains into an output voltage $V_{OUT}$ for driving a load (not shown in FIG. 1). The voltage stabilization and feedback compensation circuit 30 is configured to detect the status of the output voltage $V_{OUT}$ and provide a corresponding feed voltage $V_{FB}$. The first control circuit 40 is configured to provide a control signal GD1 according to the feed voltage $V_{FB}$, and the power Q1 may perform high-frequency switching between a turned-on state and a turned-off state according to the control signal GD1, thereby periodically transferring the energy on the primary side S1 of the transformer TR to the secondary side S2 of the transformer TR for supplying the output voltage $V_{OUT}$. The second control circuit 50 is configured to output control signals GD2 and GD3 for controlling the operation of the resonant circuit 20, thereby providing soft-switching for reducing the switching loss of the power switch Q1. Also, the second control circuit 50 is configured to detect the resonant voltages VDS2 and VDS3 of the resonant circuit 20 and output a corresponding detecting voltage VX so that the first control circuit 40 can control the operation of the voltage stabilization and feedback compensation circuit 30 according to the detecting voltage VX.

The rectifying circuit 10 may be implemented as a bridge rectifier which includes diodes D1-D4 and is configured to convert the AC voltage $V_{AC}$ provided by AC mains into an input voltage $V_{IN}'$. However, the implementation of the rectifying circuit 10 does not limit the scope of the present invention.

In an embodiment of the present invention, the boost inductor Li includes a first end coupled to the rectifying circuit 10 for receiving the input voltage $V_{IN}'$ and a second end coupled to a ground level GND1 via the power switch Q1. The diode DO1 includes an anode coupled to the second end of the boost inductor Li and a cathode coupled to the transformer TR via the resonant circuit 20. The storage capacitor C1 includes a first end coupled to the cathode of the diode DO1 and a second end coupled to the ground level GND1 for storing the energy of the input voltage $V_{IN}'$ The boost inductor Li, the diode DO1, the storage capacitor C1 and the power switch Q1 are operated to provide voltage boost. During the period when the power switch Q1 is turned on by the AC voltage $V_{AC}$ provided by AC mains, the second end of the boost inductor Li is coupled to the ground level GND1 so that the input current $I_{IN}$ may flow through the boost inductor Li and the resulting time-varying magnetic field induces an electromotive force (voltage) which is stored as magnetic energy in the boost inductor Li. During the period when the power switch Q1 is turned off by the AC voltage $V_{AC}$ provided by AC mains, the boost inductor Li is cut off from the ground level GND1 and its stored magnetic energy is converted into electrical energy, thereby generating large current which charges the storage capacitor C1 via the diode DO1, wherein the voltage established across the storage capacitor C1 is represented by the input voltage $V_{IN}$. After the power switch Q1 switches between the turned-on state and turned-off state multiple times, the input voltage $V_{IN}'$ may be boosted to a desired level of the input voltage $V_{IN}$.

In an embodiment of the present invention, the transformer TR includes a primary winding (represented by its number of turns NP) and two secondary windings (represented by respective number of turns NS1 and NS2). The primary winding NP is disposed on the primary side S1 of the transformer TR, and the secondary windings NS2 and NS3 are disposed on the secondary side S2 of the transformer TR. The diode DO2 includes an anode coupled to the dotted terminal of the secondary winding NS1 and a cathode coupled to the output end of the power supply 100 (i.e., the output voltage $V_{OUT}$). The diode DO3 includes an anode coupled to the undotted terminal of the secondary winding NS2 and a cathode coupled to the output end of the power supply 100 (i.e., the output voltage $V_{OUT}$). Meanwhile, the undotted terminal of the secondary winding NS1 and the dotted terminal of the secondary winding NS2 are coupled to a ground level GND2. The storage capacitor C2 includes a first end coupled to the cathodes of the diodes DO1 and DO2, and a second end coupled to the ground level GND2 for storing the energy of the output voltage $V_{OUT}$.

In an embodiment of the present invention, the first control circuit 40 may be a pulse width modulation integrated circuit (PWM IC) which includes pins P1~P4. The first control circuit 40 is configured to output a control signal GD1 which switches between an enable level and a disable to the power switch Q1 via its pin P1, receive a feedback voltage $V_{FB}$ provided by the voltage stabilization and feedback compensation circuit 30 via its pin P2, output a control signal GDX to the voltage stabilization and feedback compensation circuit 30 via its pin P3, and receive the detecting voltage VX provided by the second control circuit 50 via its pin P4. In the present invention, the first control circuit 40 may provide the control signal GD1 according to the feedback voltage $V_{FB}$ associated with the input voltage $V_{IN}$, and provide the control signal GDX according to the detecting voltage VX. However, the implementation of the first control circuit 40 does not limit the scope of the present invention.

In an embodiment of the present invention, the second control circuit 50 may be a PWM IC which includes pins P5~P11. The second control circuit 50 is configured to output a control signal GD2 and a control signal GD3 to the resonant circuit 20 respectively via its pins P5 and P6, output the detecting voltage VX to the first control circuit 40 via its pin P7, and detect the resonant voltages of the resonant circuit 20 via its pins P8-P11. In the present invention, the second control circuit 50 may provide the detecting voltage VX according to the resonant voltages of the resonant circuit 20. However, the implementation of the second control circuit 50 does not limit the scope of the present invention.

In an embodiment of the present invention, the first control circuit 40 and the second control circuit 50 may be implemented as two separate chips. In another embodiment of the present invention, the first control circuit 40 and the second control circuit 50 may be integrated in the same chip. However, the implementation of the first control circuit 40 and the second control circuit 50 does not limit the scope of the present invention.

In an embodiment of the present invention, the resonant circuit 20 includes resonant switches, a magnetizing inductor LM, a resonant inductor LR and a resonant capacitor CR. The resonant switch Q2 includes a first end coupled to the first end of the storage capacitor C1 and the pin P8 of the second control circuit 50, a second end coupled to the resonant switch Q3 and the pin P9 of the second control circuit 50, and a control end coupled to the pin P5 of the second control circuit 50 for receiving the control signal GD2. The resonant switch Q3 includes a first end coupled to the second end of the resonant switch Q2 and the pin P10 of the second control circuit 50, a second end coupled to the ground level GND1 and the pin P10 of the second control circuit 50, and a control end coupled to the pin P6 of the second control circuit 50 for receiving the control signal GD3. The magnetizing inductor LM includes a first end coupled to the dotted terminal of the primary winding NP in the transformer TR and a second end coupled to the undotted terminal of the primary winding NP in the transformer TR. The resonant inductor LR includes a first end coupled to the dotted terminal of the primary winding NP in the transformer TR and a second end coupled between the second end of the resonant switch Q2 and the first end of the resonant switch Q3. The resonant capacitor CR includes a first end coupled to the undotted terminal of the primary winding NP in the transformer TR and a second end coupled to the ground level GND1. The resonant circuit 20 is configured to provide soft-switching for reducing the switching loss of the power switch Q1, thereby adjusting the gain of the transformer TR for stabilizing the input voltage $V_{IN}$ and the output voltage $V_{OUT}$. The operation of the resonant circuit 20 will be described in more detail in subsequent paragraphs.

In an embodiment of the present invention, the voltage stabilization and feedback compensation circuit 30 includes a feedback capacitor $C_{FB}$, a compensation capacitor $C_C$, dividing resistors R1 and R2, an auxiliary switch QX, a discharging resistor RX, a linear optical coupler PC and a voltage regulator TL. The dividing resistors R1 and R2 are coupled in series between the input voltage $V_{IN}$ and the ground level GND1 and coupled in parallel with the storage capacitor C1 for providing the reference voltage $V_{REF}$ associated with the input voltage $V_{IN}$ on the dividing resistor R2, wherein $V_{REF}=V_{IN}*R2/(R1+R2)$. The voltage regulator TL includes a reference end R coupled between the dividing resistors R1 and R2 for receiving to the reference voltage $V_{REF}$, an anode end A coupled to the ground level GND1 and an cathode end K coupled to the linear optical coupler PC, wherein the compensation capacitor $C_C$ is coupled between the cathode end K and the reference end R of the voltage regulator TL and $V_{KA}$ represents the voltage established across the cathode end K and the anode end A of the voltage regulator TL. The voltage regulator TL is configured to adjust the compensation current $I_C$ flowing through its cathode end K and its anode end A according to the status of its reference end R. More specifically, the voltage regulator TL is configured to compare the reference voltage $V_{REF}$ received by its reference end R with a built-in baseline voltage. When the comparison result indicates an error, the compensation capacitor $C_C$ coupled between the cathode end K and the reference end R of the voltage regulator TL may adjust the gain of the voltage regulator TL so that the value of the compensation current $I_C$ may reflect the value of the input voltage $V_{IN}$.

In an embodiment of the present invention, the linear optical coupler PC includes a light-emitting diode (LED) 32 and an optical transistor 34 for performing electrical-optical-electrical conversion on the primary side S1 of the transformer TR. The LED 32 is coupled between the first input end and the second input end of the linear optical coupler PC, and includes an anode coupled to the first end of the storage capacitor C1 and a cathode coupled to the cathode end K of the voltage regulator TL. The optical transistor 34 is coupled between the first output end and the second output end of the linear optical coupler PC, and includes a first end coupled to the pin P2 of the first control circuit 40 and a second end coupled to the feedback capacitor $C_{FB}$. The feedback capacitor $C_{FB}$ includes a first end coupled to the second end of the optical transistor 24 and a second end coupled to the ground level GND1. The auxiliary switch QX includes a first end coupled to the first end of the feedback capacitor $C_{FB}$, a second end coupled to the ground level GND1 via the discharging resistor RX, and a control end coupled to the pin P3 of the control circuit 40 for receiving the control signal GDX. Since the value of the compensation current $I_C$ flowing through the LED 32 is associated with the value of the input voltage $V_{IN}$, the linear optical coupler PC may detect the variation in the input voltage $V_{IN}$ using the LED 32 on its input side, covert the electrical energy associated with the variation in the input voltage $V_{IN}$ into optical energy using the LED 32, and convert the optical energy into a feedback current $I_{FB}$ using the optical transistor 34 on its output side, thereby charging the feedback capacitor $C_{FB}$ for supplying the corresponding feedback voltage $V_{FB}$.

When the AC voltage $V_{AC}$ is normally supplied by AC mains, the storage capacitor C1 is charged by the energy of the input voltage $V_{IN}$' via the boost inductor L1 and the forward-biased diode DO1, thereby providing the input voltage $V_{IN}$ on the primary side S1 of the transformer TR. As previously stated, the reference voltage $V_{REF}$ established across the dividing resistor R2 is associated with the input voltage $V_{IN}$, and the voltage regulator TL of the voltage stabilization and feedback compensation circuit-30 is configured to compare the reference voltage $V_{REF}$ received by its reference end R with a built-in baseline voltage. When the comparison result indicates an error, the compensation capacitor $C_c$ may adjust the loop gain and the voltage $V_{KA}$ of the voltage regulator TL, thereby generating the compensation current $I_C$ for lighting the LED 32 of the linear optical coupler 32, which may then induce feedback current $I_{FB}$ flowing through the optical transistor 34. When the feedback current $I_{FB}$ flows through the compensation capacitor $C_c$, the compensation capacitor $C_c$ may be charged and store the corresponding feedback voltage $V_{FB}$. After receiving the feedback voltage $V_{FB}$ via its pin P2, the first control circuit 40 is configured to compare the feedback voltage $V_{FB}$ with a built-in triangular-wave voltage, thereby adjusting the duty cycle of the control signal GD1 for stabilizing the input voltage $V_{IN}$. During the period when the power switch Q1 is turned on, the energy of the input voltage $V_{IN}$ stored in the storage capacitor C1 may be transferred from the primary side S1 of the transformer TR to the secondary side S2 of the transformer TR, thereby charging the storage capacitor C2 for supplying the output voltage $V_{OUT}$.

Meanwhile, during the period when the AC voltage $V_AC$ is normally supplied by AC mains, the second control circuit 50 is configured to output the control signals GD2 and GD3 to the resonant circuit 20 via its pins P5 and P6, respectively, so that the resonant switches Q2 and Q3 are alternatively turned on and off in a complimentary manner. More specifically, the resonant switch Q3 is turned off when the resonant switch Q2 is turned on, and the resonant switch Q2 is turned off when the resonant switch Q3 is turned on, so that the diodes DO2 and DO3 are alternatively turned on and off accordingly. Under such circumstance, the resonant inductor LR, the magnetizing inductor LM and the resonant capacitor CR perform series resonance and provide soft-switching for reducing the switching loss of the power switch Q1, thereby stabilizing the output voltage $V_{OUT}$ by adjusting the gain of the transformer TR.

The second control circuit 50 is configured to monitor the resonant voltage VDS2 of the resonant switch Q2 based on the voltage difference between its pins P8 and P9, and monitor the resonant voltage VDS3 of the resonant switch Q3 based on the voltage difference between its pins P10 and P11. The second control circuit 50 is configured to determine whether zero-voltage switching can be achieved based on the resonant voltages VDS2 and VDS3.

Figure 3:
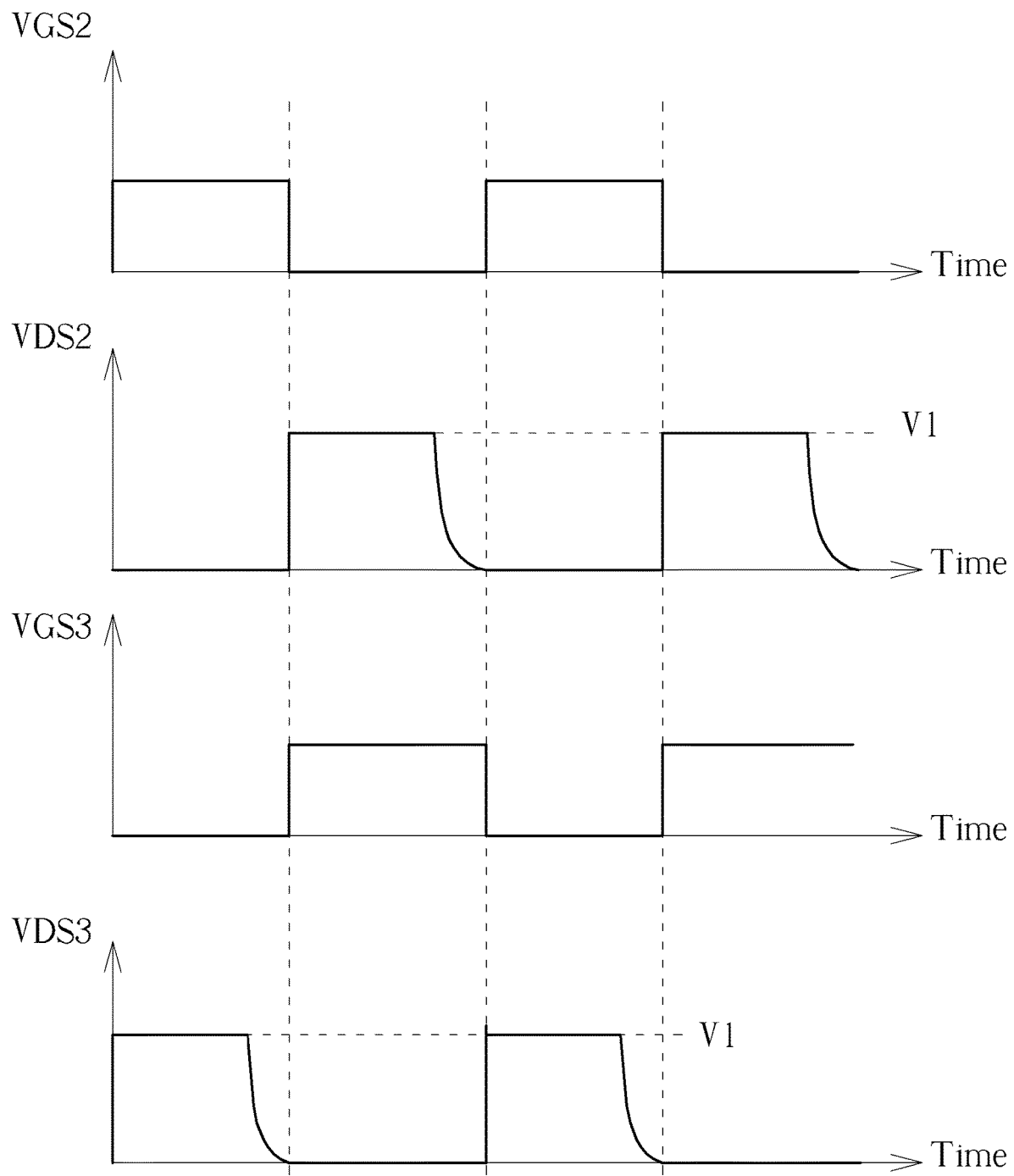
FIG. 3 is a diagram illustrating related signals when the power supply operates in a normal resonant state according to an embodiment of the present invention.

FIG. 3 is a diagram illustrating related signals when the power supply 100 operates in a normal resonant state according to an embodiment of the present invention. VGS2 represents the voltage difference between the control end and the second end of the resonant switch Q2, VDS2 represents the voltage difference between the first end and the second end of the resonant switch Q2 (i.e., the resonant voltage of the resonant switch Q2), VGS3 represents the voltage difference between the control end and the second end of the resonant switch Q3, and VDS3 represents the voltage difference between the first end and the second end of the resonant switch Q3 (i.e., the resonant voltage of the resonant switch Q3), wherein V1 represents the maximum value of the resonant voltages VDS2 and VDS3 in the normal resonant state. As depicted in FIG. 3, when the power supply 100 operates in the normal resonant state, the resonant switch Q2 starts to conduct (the control signal GD2 switches from the disable level to the enable level so that VGS2 is larger than the threshold voltage of the resonant switch Q2) only after the resonant voltage VDS2 has reached a zero voltage; the resonant switch Q3 starts to conduct (the control signal GD3 switches from the disable level to the enable level so that VGS3 is larger than the threshold voltage of the resonant switch Q3) only after the resonant voltage VDS3 has reached a zero voltage. The above-mentioned zero-voltage switching can achieve low switching loss and high efficient conversion.

Figure 4:
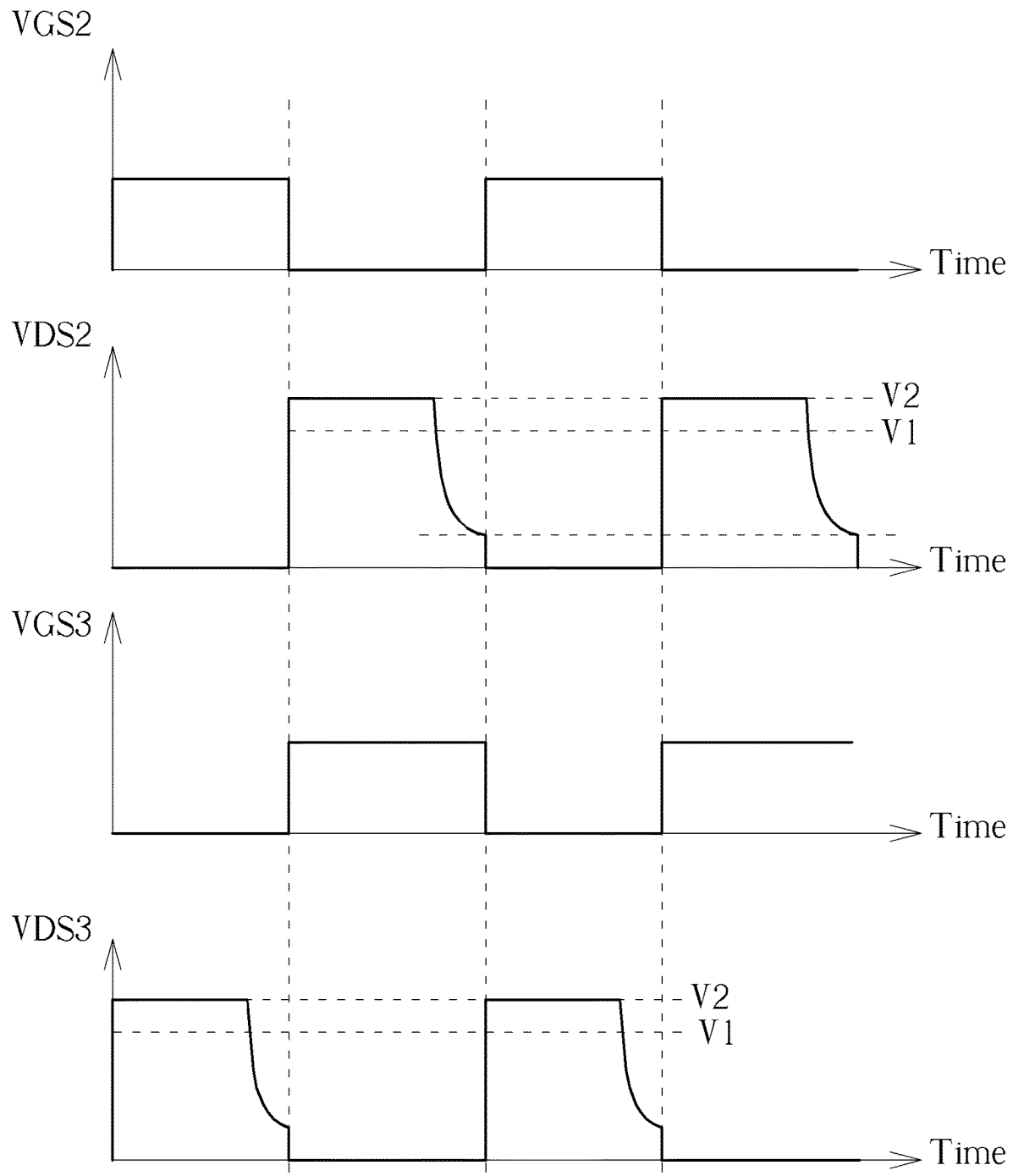
FIG. 4 is a diagram illustrating related signals when the power supply operates in an abnormal resonant state according to an embodiment of the present invention.

FIG. 4 is a diagram illustrating related signals when the power supply 100 operates in an abnormal resonant state according to an embodiment of the present invention. VGS2 represents the voltage difference between the control end and the second end of the resonant switch Q2, VDS2 represents the voltage difference between the first end and the second end of the resonant switch Q2 (i.e., the resonant voltage of the resonant switch Q2), VGS3 represents the voltage difference between the control end and the second end of the resonant switch Q3, and VDS3 represents the voltage difference between the first end and the second end of the resonant switch Q3 (i.e., the resonant voltage of the resonant switch Q3), wherein V2 represent the maximum value of the resonant voltages VDS2 and VDS3 in the abnormal resonant state. The value of the input voltage $V_{IN}$ may be excessively large due to the stray capacitance, stray inductance or parasite devices present in the circuit loop, which in turn results in excessively large resonant voltages of the resonant switches (the maximum value of the resonant voltages VDS2 and VDS3 is raised from V1 to V2). Under such circumstance, the resonant switch Q2 starts to conduct when the resonant voltage VDS2 has not reached a zero voltage (the control signal GD2 switches from the disable level to the enable level when the resonant voltage VDS2 is not zero); the resonant switch Q3 starts to conduct when the resonant voltage VDS3 has not reached a zero voltage (the control signal GD3 switches from the disable level to the enable level when the resonant voltage VDS3 is not zero). When the resonant circuit 20 is unable to provide zero-voltage switching, the power supply 100 has higher switching loss and low efficient conversion when operating in the abnormal resonant state.

When determining that the resonant switches Q2 and Q3 fail provide zero-voltage switching based on the control signal GD1, the control signal GD2, the resonant voltage VDS2 and the resonant voltage VDS3, the second control circuit 50 is configured to output the detecting voltage VX having a first level (such as a high level) to the first control circuit 40. After receiving the detecting voltage VX having the first level, the first control circuit 40 is configured to output the control signal GDX having an enable level for turning on the auxiliary switch QX in the voltage stabilization and feedback compensation circuit 30. Under such circumstance, the energy stored in the feedback capacitor $C_{FB}$ may be discharged to the ground level GND1 via the discharging resistor RX, thereby lowering the feedback voltage $V_{FB}$. The duty cycle of the control signal GD1 also decreases with the feedback voltage $V_{FB}$, thereby lowering the input voltage $V_{IN}$. When the maximum value of the resonant voltages VDS2 and VDS3 decreases with the input voltage $V_{IN}$, the resonant switches Q2 and Q3 are now able to provide zero-voltage switching.

Figure 5:
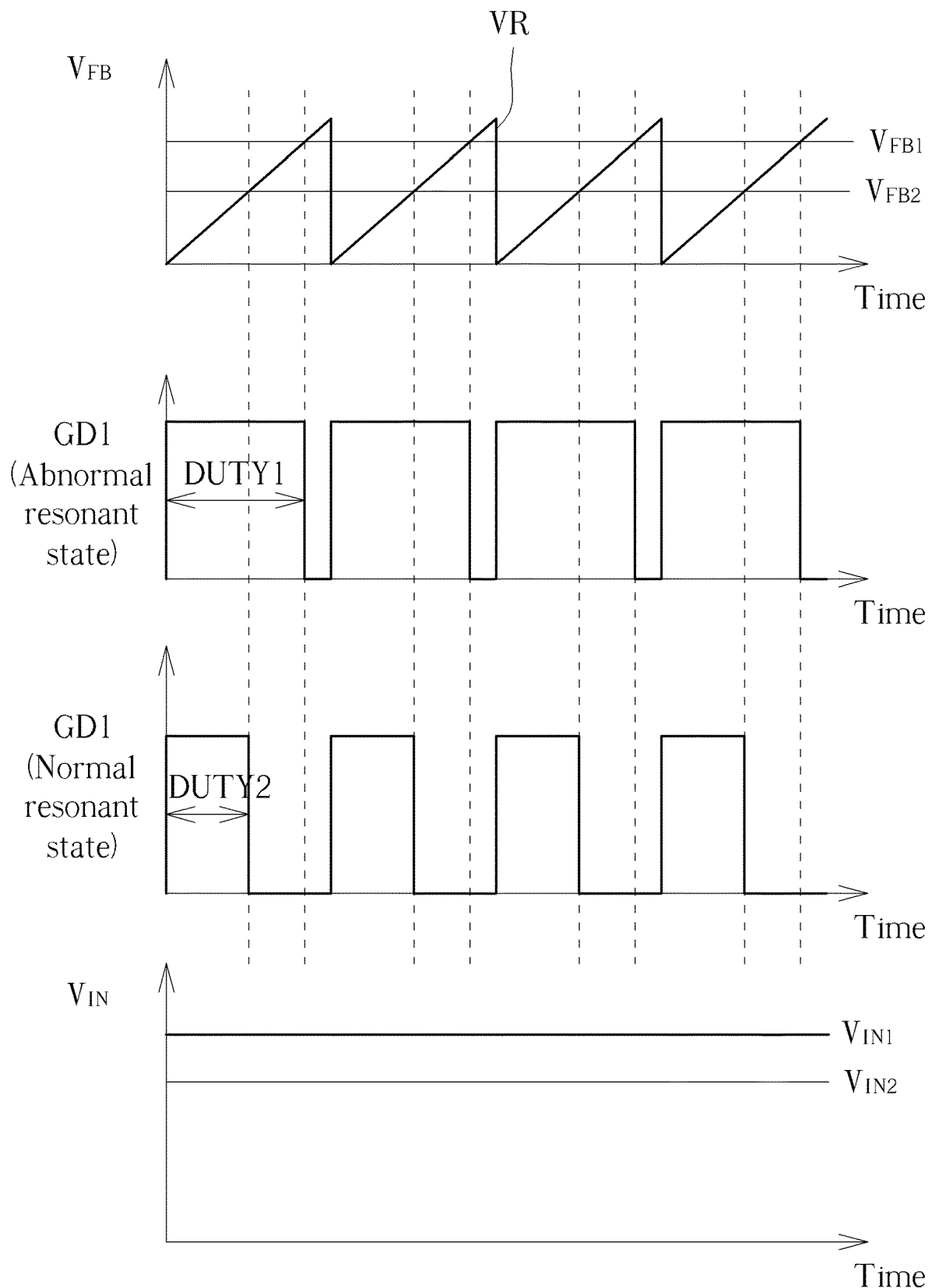
FIG. 5 is a diagram illustrating related signals when the power supply performs voltage stabilization and feedback compensation according to an embodiment of the present invention.

FIG. 5 is a diagram illustrating related signals when the power supply 100 performs voltage stabilization and feedback compensation according to an embodiment of the present invention. The first control circuit 40 is configured to compare the feedback voltage $V_{FB}$ with a built-in triangular-wave voltage VR, thereby adjusting the duty cycle of the control signal GD1. When the value of the feedback voltage $V_{FB}$ is equal to $V_{FB1}$, the duty cycle of the control signal GD1 has a value DUTY1 corresponding to the period when $V_{FB1}>VR$, and the value of the corresponding input voltage $V_{IN}$ is equal to $V_{IN1}$. When determined that the resonant switches Q2 and Q3 are unable to perform zero-voltage switching, the second circuit 50 is configured to output the detecting voltage VX having the first level (such as a high level) to the first control circuit 40.

Next, after receiving the detecting voltage VX associated with the abnormal resonant state from the second control circuit 50, the first control circuit 40 is configured to output the control signal GDX having an enable level for turning on the auxiliary switch QX in the voltage stabilization and feedback compensation circuit 30, so that the energy stored in the feedback capacitor $C_{FB}$ may be discharged to the ground level GND1. Under such circumstance, the value of the feedback voltage $V_{FB}$ is pulled down to $V_{FB1}$, and the duty cycle of the control signal GD1 has a value DUTY2 corresponding to the period when $V_{FB2}>VR$, wherein DUTY2<DUTY1. The turn-on time of the power switch Q1 may be reduced by shortening the duty cycle of the control signal GD1, thereby lowering the value of the input voltage $V_{IN}$ to $V_{IN2}$ so that the power supply 100 may operate in the normal resonant state.

In an embodiment of the present invention, each of the power switch Q1, the resonant switches Q2-Q3 and the auxiliary switch QX may be a metal-oxide-semiconductor field-effect transistor (MOSFET), a bipolar junction transistor (BJT), or another device with similar function. For N-type transistors, the enable level is logic 1 and the disable level is logic 0; for P-type transistors, the enable level is logic 0 and the disable level is logic 1. However, the type of the power switch Q1, the resonant switches Q2-Q3 or the auxiliary switch QX does not limit the scope of the present invention.

In conclusion, the present power supply may provide soft-switching using a resonant circuit in order to reduce the switching loss of the power switch and stabilize the input voltage. When it is determined that the resonant circuit is operating in the abnormal resonant state, the turn-on time of the power switch is shortened for lowering the value of the input voltage so that the resonant circuit may operate in the normal resonant state. Therefore, the present invention provides a power supply capable of stabilizing and compensating resonant voltages for achieving low switching loss and high conversion efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A power supply which stabilizes and compensates resonant voltages, comprising:
an input end coupled to an input voltage;
an output end for outputting an output voltage;
a transformer configured to transfer energy of the input voltage from a primary side to a secondary side for supplying the output voltage, and comprising:
a first secondary winding disposed on the secondary side and including a first dotted terminal and a first undotted terminal;
a second secondary winding disposed on the secondary side and including a second dotted terminal and a second undotted terminal;
a primary winding disposed on the primary side and including a third dotted terminal and a third undotted terminal;
a first storage capacitor for storing the energy of the input voltage, and including:
a first end coupled to the input voltage; and
a second end coupled to a first ground level;
a first switch, including:
a first end coupled to the input voltage;
a second end coupled to the second end of the first storage capacitor; and
a control end for receiving a first control signal which switches between a first enable level and a first disable level;
a resonant circuit coupled to the primary winding in the transformer and configured to provide a soft-switching based on a second control signal and a third control signal, wherein the second control signal switches between a second enable level and a second disable level, and the third control signal switches between a third enable level and a third disable level;
a voltage stabilization and feedback compensation circuit configured to:
provide a reference voltage associated with the input voltage;
provide a feedback voltage associated with the reference voltage; and
receive a fourth control signal and lower the feedback voltage when the fourth signal is at a fourth enable level;
a first control circuit disposed on the primary side and configured to:
provide the first control signal and adjust a duty cycle of the first control signal according to the feedback voltage;
receive a detecting voltage and provide the fourth control signal having the fourth enable level when the detecting voltage is at a first level; and
a second control circuit disposed on the primary side and configured to:
provide the second control signal and the third control signal;
detect at least one resonant voltage of the resonant circuit;
adjust a duty cycle of the first control signal according to the feedback voltage;
provide the detecting voltage having the first level when it is determined based on the second control signal, the third control signal and the at least one resonant voltage that the resonant circuit is unable to provide the soft-switching; and
provide the detecting voltage having a second level when it is determined based on the second control signal, the third control signal and the at least one resonant voltage that the resonant circuit is able to provide the soft-switching;
wherein the voltage stabilization and feedback compensation circuit comprises:
a voltage regulator configured to provide a compensation current associated with the reference voltage and including:
a cathode end;
an anode end;
a reference end coupled to the reference voltage; and
a compensation capacitor coupled between the cathode end and the reference end of the voltage regulator for adjusting a gain of the voltage regulator;
a linear optical coupler comprising:
a light-emitting diode configured to convert electrical energy associated with the input voltage into optical energy, and including:
an anode coupled to the first end of the first storage capacitor;
a cathode coupled to the cathode end of the voltage regulator; and
an optical transistor configured to receive the optical energy and convert the optical energy into a feedback current, and including:
a first end coupled to the first control circuit for outputting the feedback voltage; and
a second end;
a feedback capacitor coupled to the optical transistor and configured to provide the feedback voltage by storing energy associated with the feedback current; and
an auxiliary switch including:
a first end coupled to the feedback capacitor;
a second end coupled to the first ground level; and
a control end coupled to the first control circuit for receiving the fourth control signal.

2. The power supply of claim 1, wherein the resonant circuit comprises:
a second switch, including:
   a first end coupled to the first end of the first storage capacitor;
   a second end; and
   a control end coupled to the second control circuit for receiving the second control signal;
a third switch, including:
   a first end coupled to the second end of the second switch;
   a second end the second end of the first storage capacitor; and
   a control end coupled to the second control circuit for receiving the third control signal;
a magnetizing inductor, including:
   a first end coupled to the third dotted terminal of the primary winding; and
   a second end coupled to the third undotted terminal of the primary winding;
a resonant inductor, including:
   a first end coupled to the third dotted terminal of the primary winding; and
   a second end coupled between the second end of the second switch and the first end of the third switch; and
a resonant capacitor, including:
   a first end coupled to the third undotted terminal of the primary winding; and
   a second end coupled to the first ground level.

3. The power supply of claim 2, wherein:
the third control signal is at the third disable level when the second control signal is at the second enable level; and
the third control signal is at the third enable level when the second control signal is at the second disable level.

4. The power supply of claim 2, wherein the second control signal is further configured to:
detect a first resonant voltage of the resonant circuit which is a voltage difference between the first end of the second switch and the second end of the second switch-inductor; and
determine that the resonant circuit is unable to provide the soft-switching if the first resonant voltage has not reached a zero voltage when the second control signal switches from the second disable level to the second enable level.

5. The power supply of claim 4, wherein the third control signal is further configured to:
detect a second resonant voltage of the resonant circuit which is a voltage difference between the first end of the third switch and the second end of the third switch; and
determine that the resonant circuit is unable to provide the soft-switching if the second resonant voltage has not reached the zero voltage when the third control signal switches from the third disable level to the third enable level.

6. The power supply of claim 1, wherein:
the voltage stabilization and feedback compensation circuit further comprises a discharging resistor coupled between the second end of the auxiliary switch and the first ground level; and
the energy stored in the feedback capacitor is discharged to the first ground level for reducing a value of the feedback voltage when the auxiliary switch is turned on by the fourth control signal having the fourth enable level.

7. The power supply of claim 1, wherein
the voltage stabilization and feedback compensation circuit further comprises a first dividing resistor and a second dividing resistor coupled in series between the input voltage and the first ground level for providing the reference voltage by voltage-dividing the input voltage.

8. The power supply of claim 1, further comprising a boost inductor which includes:
a first end coupled to the input end; and
a second end coupled to the first end of the first switch.

9. The power supply of claim 8, further comprising a first diode which includes:
an anode coupled to the second end of the boost inductor; and
a cathode coupled to the first end of the first storage capacitor.

10. The power supply of claim 1, further comprising a second storage capacitor coupled between the output end and a
second ground level for storing energy of the output voltage.

11. The power supply of claim 1, further comprising:
a second diode including:
   an anode coupled to the first dotted terminal of the first secondary winding; and
   a cathode coupled to the output end; and
a third diode including:
   an anode coupled to the second undotted terminal of the second secondary winding; and
   a cathode coupled to the output end.

12. The power supply of claim 11, wherein:
the second diode is turned on when the third diode is turned off; and
the second diode is turned off when the third diode is turned on.

13. The power supply of claim 1, wherein the first control circuit and the second control are integrated in a same chip.

14. The power supply of claim 1, wherein the first control circuit is a pulse width modulation integrated circuit which includes:
a first pin for outputting the first control signal to the first switch;
a second pin coupled to the voltage stabilization and feedback compensation circuit for receiving the feedback voltage;
a third pin for outputting the fourth control signal to the voltage stabilization and feedback compensation circuit; and
a fourth pin coupled to the second control circuit for receiving the detecting voltage.

15. The power supply of claim 1, wherein the second control circuit is a pulse width modulation integrated
circuit which includes:
a fifth pin for outputting the second control signal to the resonant circuit;
a sixth pin for outputting the third control signal to the resonant circuit;
a seventh pin for outputting the detecting voltage to the first control circuit;

an eighth pin and a ninth pin coupled to the resonant circuit for detecting a first resonant voltage of the resonant circuit; and a tenth pin and an eleventh pin coupled to the resonant circuit for detecting a second resonant voltage of the resonant circuit.

16. The power supply of claim 1, further comprising a rectifying circuit is implemented as a bridge rectifier.

17. A power supply which stabilizes and compensates resonant voltages, comprising:

an input end coupled to an input voltage;

an output end for outputting an output voltage;

a transformer configured to transfer energy of the input voltage from a primary side to a secondary side for supplying the output voltage, and comprising:

a first secondary winding disposed on the secondary side and including a first dotted terminal and a first undotted terminal;

a second secondary winding disposed on the secondary side and including a second dotted terminal and a second undotted terminal;

a primary winding disposed on the primary side and including a third dotted terminal and a third undotted terminal;

a first storage capacitor for storing the energy of the input voltage, and including:

a first end coupled to the input voltage; and a second end coupled to a first ground level;

a first switch, including:

a first end coupled to the input voltage;

a second end coupled to the second end of the first storage capacitor; and a control end for receiving a first control signal which switches between a first enable level and a first disable level;

a resonant circuit coupled to the primary winding in the transformer and configured to provide a soft-switching based on a second control signal and a third control signal, wherein the second control signal switches between a second enable level and a second disable level, and the third control signal switches between a third enable level and a third disable level;

a voltage stabilization and feedback compensation circuit configured to:

provide a reference voltage associated with the input voltage;

provide a feedback voltage associated with the reference voltage; and receive a fourth control signal and lower the feedback voltage when the fourth signal is at a fourth enable level;

a first control circuit disposed on the primary side and configured to:

provide the first control signal and adjust a duty cycle of the first control signal according to the feedback voltage;

receive a detecting voltage and provide the fourth control signal having the fourth enable level when the detecting voltage is at a first level; and a second control circuit disposed on the primary side and configured to:

provide the second control signal and the third control signal;

detect at least one resonant voltage of the resonant circuit;

adjust a duty cycle of the first control signal according to the feedback voltage;

provide the detecting voltage having the first level when it is determined based on the second control signal, the third control signal and the at least one resonant voltage that the resonant circuit is unable to provide the soft-switching; and provide the detecting voltage having a second level when it is determined based on the second control signal, the third control signal and the at least one resonant voltage that the resonant circuit is able to provide the soft-switching;

wherein the second control circuit is a pulse width modulation integrated circuit which includes:

a fifth pin for outputting the second control signal to the resonant circuit;

a sixth pin for outputting the third control signal to the resonant circuit;

a seventh pin for outputting the detecting voltage to the first control circuit;

an eighth pin and a ninth pin coupled to the resonant circuit for detecting a first resonant voltage of the resonant circuit; and a tenth pin and an eleventh pin coupled to the resonant circuit for detecting a second resonant voltage of the resonant circuit.

* * * * *